US007769981B2

(12) United States Patent
Lyuh et al.

(10) Patent No.: US 7,769,981 B2
(45) Date of Patent: Aug. 3, 2010

(54) ROW OF FLOATING POINT ACCUMULATORS COUPLED TO RESPECTIVE PES IN UPPERMOST ROW OF PE ARRAY FOR PERFORMING ADDITION OPERATION

(75) Inventors: Chun Gi Lyuh, Daejeon (KR); Yil Suk Yang, Daejeon (KR); Se Wan Heo, Busan (KR); Soon Il Yeo, Daejeon (KR); Tae Moon Roh, Daejeon (KR); Jong Dae Kim, Daejeon (KR); Ki Chul Kim, Seoul (KR); Se Hoon Yoo, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 74 days.

(21) Appl. No.: 12/045,844

(22) Filed: Mar. 11, 2008

(65) Prior Publication Data
US 2008/0294875 A1 Nov. 27, 2008

(30) Foreign Application Priority Data
May 23, 2007 (KR) ...................... 10-2007-0050015

(51) Int. Cl.
*G06F 15/80* (2006.01)
(52) U.S. Cl. ........................................ 712/16; 712/222
(58) Field of Classification Search .................. None
See application file for complete search history.

(56) References Cited

U.S. PATENT DOCUMENTS

| 5,129,092 A | * | 7/1992 | Wilson | 712/16 |
| 5,434,808 A | * | 7/1995 | Cohen | 708/402 |
| 5,598,408 A | * | 1/1997 | Nickolls et al. | 370/351 |
| 5,719,642 A | * | 2/1998 | Lee | 348/699 |
| 7,196,708 B2 | * | 3/2007 | Dorojevets et al. | 345/502 |
| 2002/0039386 A1 | * | 4/2002 | Han et al. | 375/240.16 |
| 2007/0011411 A1 | * | 1/2007 | Stewart et al. | 711/154 |
| 2008/0291198 A1 | * | 11/2008 | Chun et al. | 345/419 |

FOREIGN PATENT DOCUMENTS

| JP | 2006-344238 | 12/2006 |
| KR | 1020020079906 | 10/2002 |
| KR | 1020030064391 | 7/2003 |

(Continued)

OTHER PUBLICATIONS

KIPO Notice of Patent Grant dated May 23, 2008 for the corresponding application KR 10-2007-0050015.

(Continued)

*Primary Examiner*—Kenneth S Kim
(74) *Attorney, Agent, or Firm*—Ladas & Parry LLP

(57) ABSTRACT

Provided is a parallel processor for supporting a floating-point operation. The parallel processor has a flexible structure for easy development of a parallel algorithm involving multimedia computing, requires low hardware cost, and consumes low power. To support floating-point operations, the parallel processor uses floating-point accumulators and a flag for floating-point multiplication. Using the parallel processor, it is possible to process a geometric transformation operation in a 3-dimensional (3D) graphics process at low cost. Also, the cost of a bus width for instructions can be minimized by a partitioned Single-Instruction Multiple-Data (SIMD) method and a method of conditionally executing instructions.

10 Claims, 7 Drawing Sheets

FOREIGN PATENT DOCUMENTS

| | | |
|---|---|---|
| KR | 1020070077578 | 7/2007 |
| WO | WO2005/106646 | 11/2005 |

OTHER PUBLICATIONS

Andrea Di Blas et al. "The UCSC Kestrel Parallel Processor." IEEE Transactions on Parallel and Distributed Systems, vol. 16, No. 1, Jan. 2005. pp. 80-92.

Takashi Takemoto et al. "T4G: Media Processor including 3D Graphics for Mobile Set based on Configurable Processor." 2004 IEEE Asia-Pacific Conference on Advanced System Integrated Circuits (AP-ASIC2004). Aug. 4-5, 2004. pp. 156-159.

Sehoon Yoo et al. "A Parellel Processor for Efficient Processing of Mobile Multimedia." 2007 (in Korean with English abstract).

* cited by examiner

ROW OF FLOATING POINT ACCUMULATORS COUPLED TO RESPECTIVE PES IN UPPERMOST ROW OF PE ARRAY FOR PERFORMING ADDITION OPERATION

CROSS-REFERENCE TO RELATED APPLICATION

This application claims priority to and the benefit of Korean Patent Application No. 2007-50015, filed May 23, 2007, the disclosure of which is incorporated herein by reference in its entirety.

BACKGROUND

1. Field of the Invention

The present invention relates to a parallel processor for efficient processing of mobile multimedia, and more particularly, to a parallel processor structure for efficiently using various multimedia-related standard technologies, such as 3-dimensional (3D) graphics, moving-picture codecs including H.264/H.263/Moving Picture Experts Group (MPEG)-4, still-image codecs including Joint Photographic Experts Group (JPEG) and JPEG 2000, and audio codecs including MPEG-1 Audio Layer 3 (MP3).

The present invention is derived from a project entitled "Components/Module Technology for Ubiquitous Terminals [2006-S-006-02]" conducted as an IT R&D program for the Ministry of Information and Communication (Republic of Korea).

2. Discussion of Related Art

The necessity for various portable devices, such as a cellular phone, a Personal Digital Assistant (PDA), a Portable Multimedia Player (PMP), etc., to provide various media services, such as moving pictures, still images, audio, 3D graphics, etc., is on the increase. Thus far, to implement such multimedia terminals, service modules for respective media, such as moving pictures, still images, audio, 3D graphics, etc., have been developed using software, hardware, or both, and the developed service modules have been installed in a terminal according to a service type that the terminal will provide.

Although a general microprocessor installed in a portable terminal has lower performance than that of a general personal computer (PC), it has to perform a variety of tasks. Thus, when real-time execution is needed, the developed service modules are implemented by hardware or hardware-software integrated design. In other words, exclusive hardware is generally used for real-time execution in the service module. To provide real-time service for various media to one portable terminal, exclusive hardware for the respective media must be installed in the terminal. Such an increase in hardware leads to increases in power consumption as well as cost, and the increase in power consumption reduces efficiency of the portable terminal.

Instead of the method using exclusive hardware for respective media services, a method using a parallel processor can be employed, which provides all kinds of media services using one parallel processor. For example, when a moving picture service is performed, an algorithm for a moving picture medium is executed in the parallel processor, and when a 3D graphics service is performed, algorithms for geometric transformation or rasterization are performed in the parallel processor. Therefore, the method using a parallel processor has advantages of low cost, low power consumption, flexibility and high performance, in comparison with the method using exclusive hardware for respective media.

Much research on parallel processors has been conducted. A parallel processor "MorphoSys" was researched at the University of California, Irvine to perform multimedia computation. MorphoSys can control processors within the parallel processor in units of a row or column. Therefore, operation of the processors can be differently controlled according to rows or columns. Using such a structure, it is possible to develop a more flexible parallel algorithm compared to a parallel processor structure in which all processors perform the same operation. However, in order to control rows or columns differently, different control signals for respective rows or columns must be generated. In other words, as many control signals as the number of rows or columns must be generated, and thus a control signal bus having a width capable of supporting the control signals must be connected to the parallel processor. Such an increase in bus width leads to increases in hardware cost and power consumption.

Among multimedia computing, 3D graphics needs a floating-point operation, thus requiring a very large amount of computing. A parallel processor "Kestrel" performed the floating-point operation at the University of California, Santa Cruz, which took a long time. Since the floating-point operation takes a long time without an exclusive device for the floating-point operation, exclusive hardware is generally used to perform the floating-point operation. Also in a processor "T4G" of Toshiba, an exclusive module for rendering is used for processing 3D graphics. When an exclusive module is used like this, high-speed computing is enabled, but cost increases.

SUMMARY OF THE INVENTION

The present invention is directed to a parallel processor structure for efficient processing of mobile multimedia computing.

The present invention is also directed to a parallel processor structure requiring low hardware cost and low power while having a flexible structure for easy development of a parallel algorithm associated with multimedia computing.

The present invention is also directed to a parallel processor structure directly connected with a memory, capable of additionally supporting a floating-point operation, and having the operation characteristics of partitioned Single-Instruction Multiple-Data (SIMD) and conditional execution.

One aspect of the present invention provides a parallel processor, comprising: a Processing Element (PE) array having a plurality of PEs; a local memory directly connected to the PE array; a floating-point accumulator array having a plurality of accumulators connected to the PE array and accelerating a floating-point addition operation; and a control unit for reading an instruction from an external memory, broadcasting the instruction to the PEs of the PE array, and addressing the local memory when a PE communicates with the local memory.

The respective PEs may include: input and output ports for transferring and receiving data to and from neighboring PEs; a functional unit for performing arithmetic and logical operations; a register file for storing an operator to be input to the functional unit and the operation result of the functional unit; and an instruction decoder for decoding the instruction received from the control unit and generating a control signal for controlling operation of the input and output ports, the register file, and the functional unit.

Another aspect of the present invention provides a parallel processor for supporting a floating-point operation, comprising: a PE array having a plurality of PEs; and a floating-point accumulator array having accumulators respectively connected to PEs of one row in the PE array to accelerate the floating-point addition operation. Here, the respective PEs of the PE array include a flag for floating-point multiplication used for normalization of floating-point multiplication.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Figure 1:
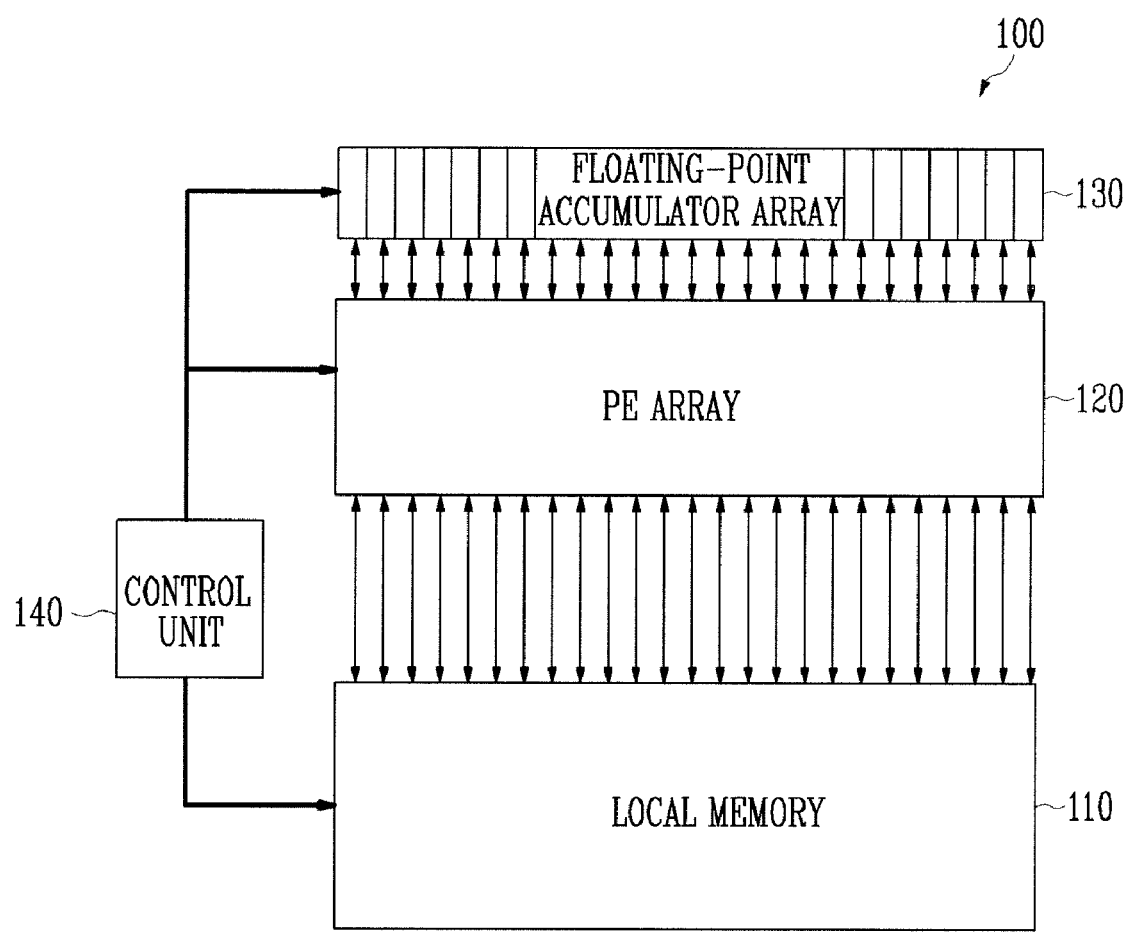
FIG. 1 illustrates a structure of a parallel processor according to the present invention.

FIG. 1 illustrates a structure of a parallel processor according to the present invention. As illustrated in the drawing, a parallel processor 100 according to the present invention comprises a Processing Element (PE) array 120, a local memory 110 directly connected to the PE array 120, a floating-point accumulator array 130 for accelerating floating-point addition, and a control unit 140 for controlling the blocks 110, 120 and 130.

The PE array 120 is composed of a plurality of PEs, e.g., 4 rows and 24 columns. The PEs are connected with each other in a mesh network structure and can perform two-way communication with neighboring PEs to the north, south, east and west of themselves.

Figure 2:
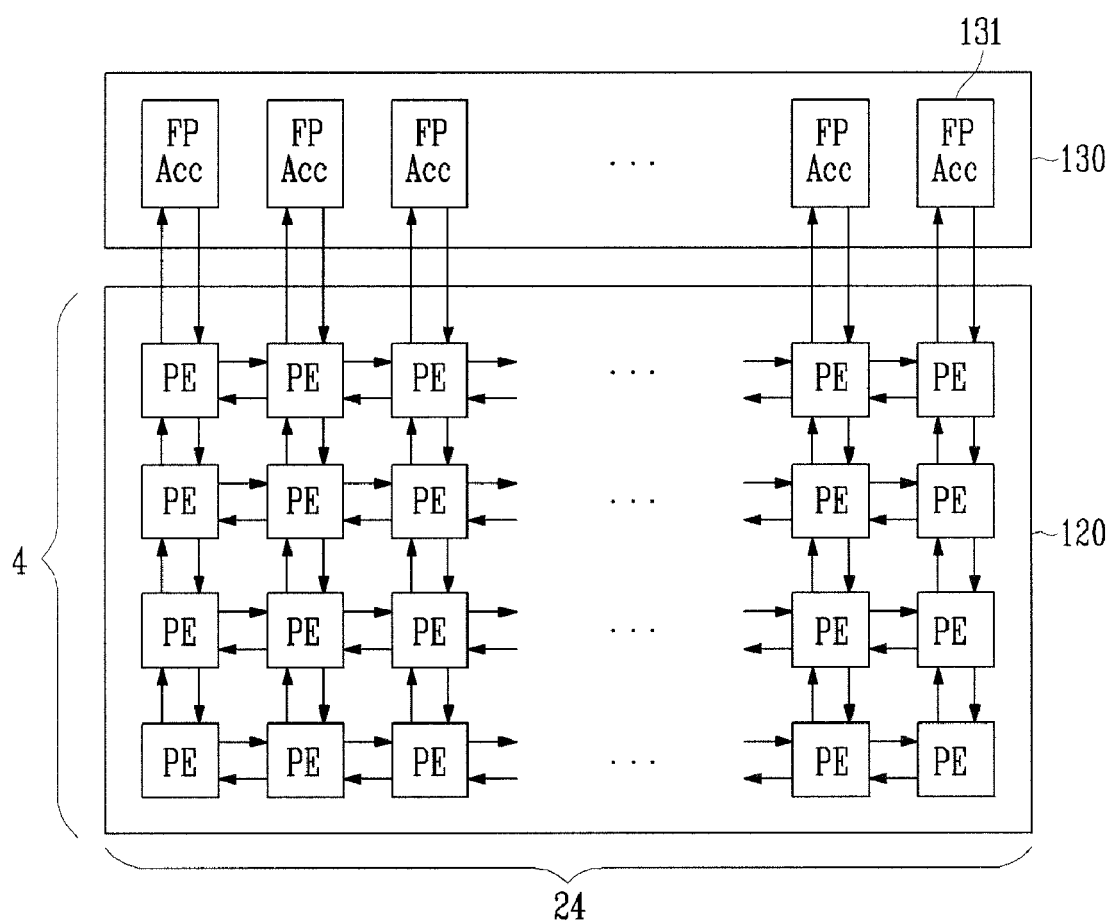
FIG. 2 illustrates a connection structure between a Processing Element (PE) array and a floating-point accumulator array according to an exemplary embodiment of the present invention.

The floating-point accumulator array 130 connected to the north of the PE array 120 is composed of the same number of accumulators as the number of PEs included in one row of the PE array 120, and the accumulators are connected with PEs of the same column in the uppermost row of the PE array 120 to transfer and receive data to and from the PEs. The floating-point accumulator array 130 is used for accelerating an addition operation of floating-point matrix multiplication used for geometric transformation of a 3-dimensional (3D) graphics process. A connection structure between the PE array 120 and the floating-point accumulator array 130 is illustrated in FIG. 2 according to the present invention. As illustrated in the drawing, respective accumulators 131 are connected with the PEs of the same column in the uppermost row of the PE array 120 to communicate with each other.

Figure 3:
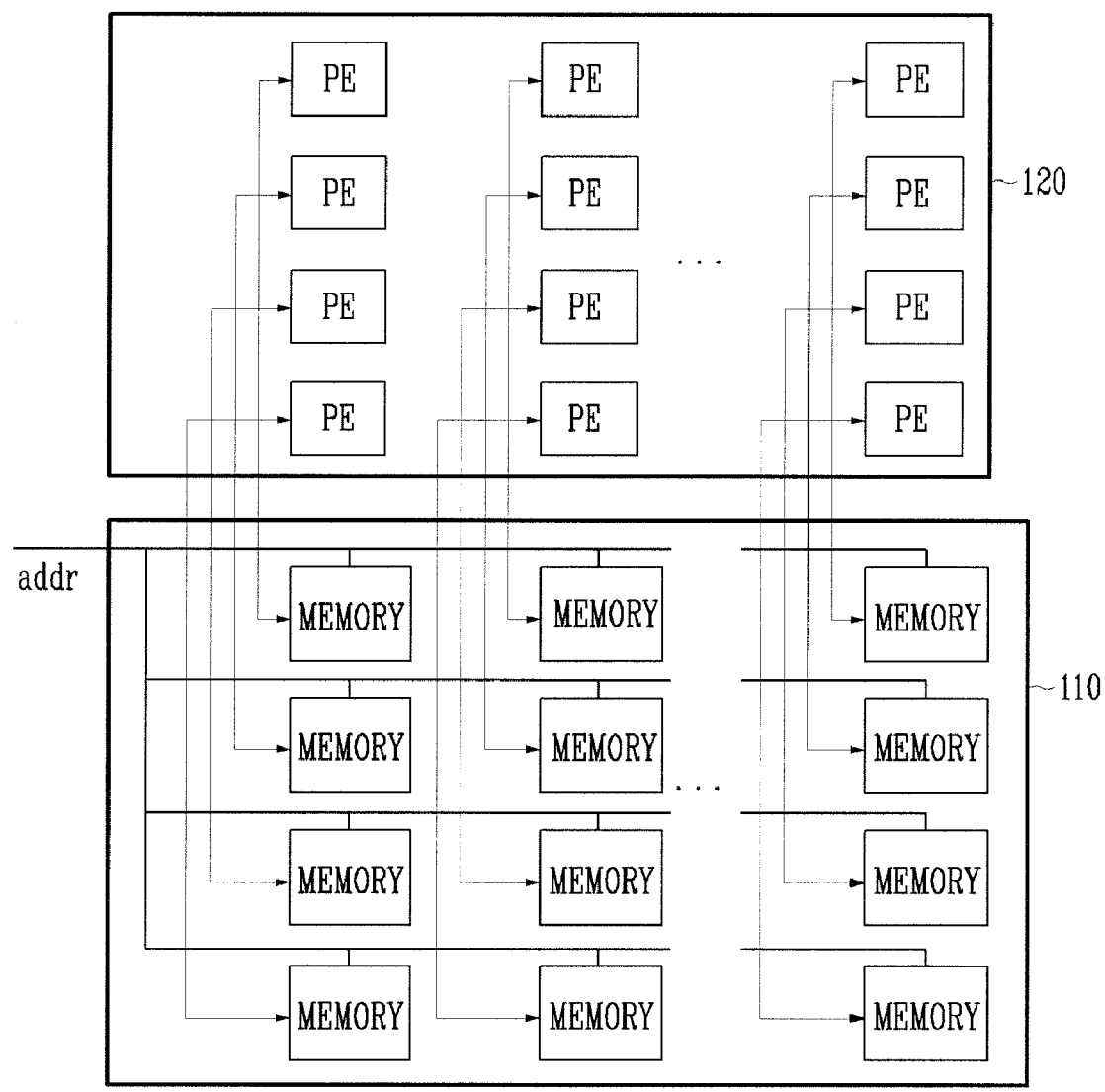
FIG. 3 illustrates a connection structure between a PE array and a local memory according to an exemplary embodiment of the present invention.

The local memory 110 is directly connected with the PE array 120 and has memory spaces allocated to the respective PEs. When the local memory 110 communicates with the PE array 120, a memory address is provided by the control unit 140. A connection structure between the PE array 120 and the local memory 110 is illustrated in FIG. 3 according to the present invention.

The control unit 140 reads an instruction from a system memory outside the parallel processor, broadcasts the instruction to all the PEs of the PE array 120, and applies an address to the local memory 110 when a PE communicates with the local memory 110.

Figure 4:
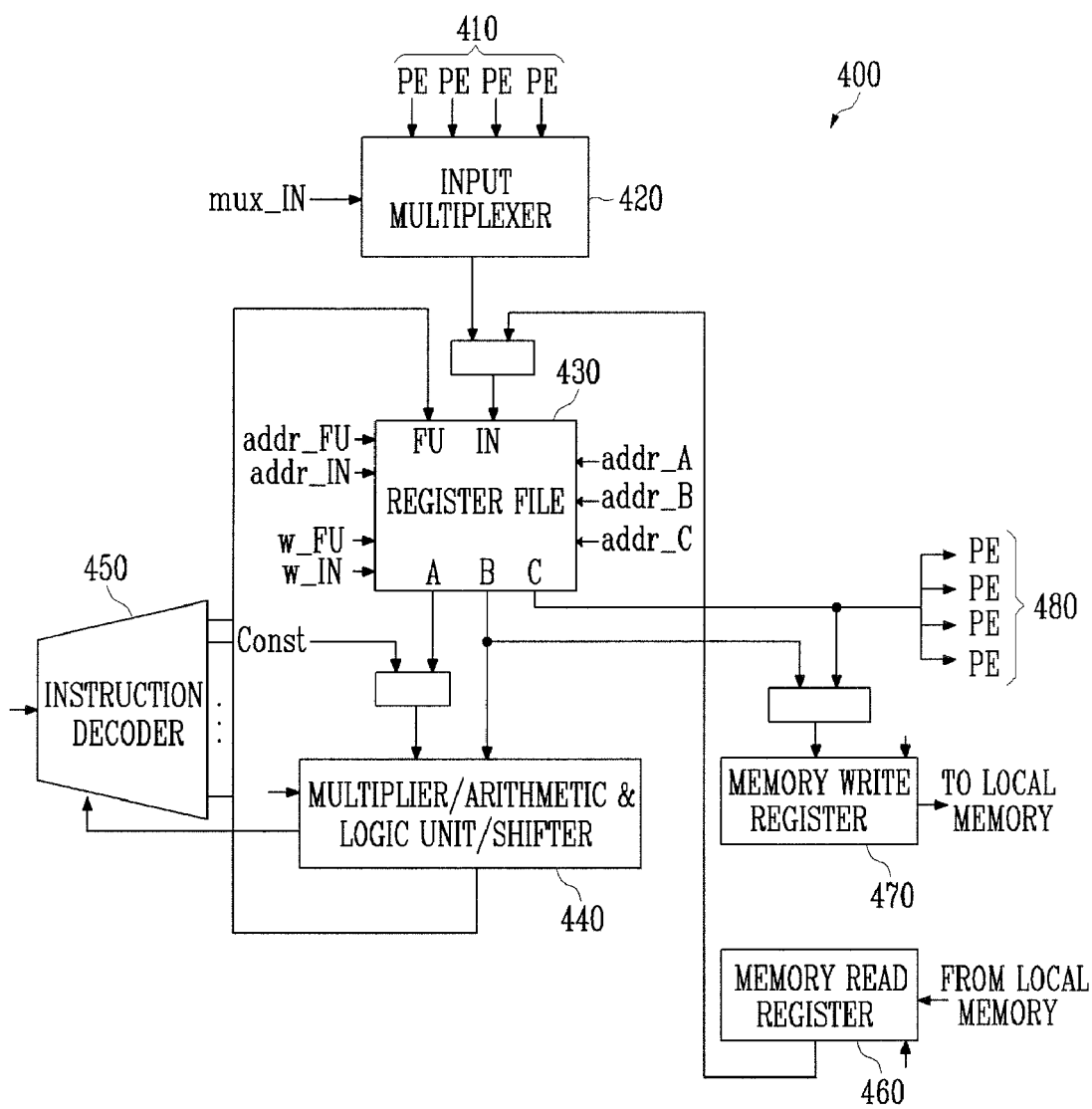
FIG. 4 illustrates a detailed structure of a PE included in a PE array according to the present invention.

FIG. 4 illustrates a detailed structure of a PE included in a PE array according to the present invention. A PE 400 may fundamentally perform data communication, computing, etc., in units of 16 bits.

More specifically, the PE 400 includes input and output ports 410 and 480, an input multiplexer 420, a functional unit 440, a register file 430, a memory read register 460, a memory write register 470, and an instruction decoder 450. The input and output ports 410 and 480 transfer and receive data to and from neighboring PEs disposed to the north, south, east and west of the PE 400. The input multiplexer 420 selects one input from the input ports 410. The functional unit 440 has a multiplier, an arithmetic/logic unit and a shifter and performs arithmetic and logical operations. The register file 430 stores an operator to be input to the functional unit 440 and the operation result of the functional unit 440. The memory read register 460 stores data read from a local memory, and the memory write register 470 stores data to be recorded in the local memory. The instruction decoder 450 decodes an instruction received from a control unit and generates a control signal for controlling operation of the input multiplexer 420, the register file 430 and the functional unit 440.

In the register file 430, 32 16-bit registers may be included. Among the 32 registers, a zeroth register is designated to store a value "0" at all times because the value "0" is frequently used. Thus, a user cannot store data in the zeroth register.

The register file 430 has 2 inputs, and thus can store data obtained from 2 directions in different registers at a time, respectively. For this reason, while the functional unit 440 performs computing and stores the result in the register file 430, data can be received from a neighboring PE or read from the local memory. In addition, the register file has 3 outputs A, B and C and thus can provide data of different registers to the functional unit 440 (A), to the functional unit 440 or a memory (B), and to a neighboring PE or the memory (C). This mechanism is aimed at supporting a more flexible structure when an algorithm using the parallel processor of the present invention is developed.

Operation of the modules in the PE 400 is determined by an output of the instruction decoder 450. The instruction decoder 450 receives a part of an instruction excluding a control signal for the floating-point accumulator array 130 and the local memory 110, and generates all control signals for determining operation of the modules in the PE 400.

The functional unit 440, which includes the multiplier, the arithmetic/logic unit and the shifter, performs computing-related operation of the PE 400. The core module included in the multiplier is an 18-bit two's complement array multiplier.

Although the parallel processor of the present invention fundamentally processes data in units of 16 bits, the 18-bit two's complement array multiplier is used in order to support all of 16-bit two's complement multiplication, 16-bit integer multiplication and 16-bit mantissa multiplication. The 16-bit mantissa multiplication is for floating-point multiplication of 3D graphics using a 24-bit floating-point format, which is needed because the mantissa part of the 24-bit floating-point format is defined by 16 bits. Operation of the multiplier is as follows. Since the 16-bit mantissa of the 24-bit floating-point format includes a hidden bit, the hidden bit must be generated again to actually perform multiplication. Therefore, the 16-bit mantissa multiplication may be performed as 17-bit integer multiplication. However, since the 18-bit two's complement array multiplier is used, 18-bit positive number multiplication is performed using "0" instead of a sign bit.

In the 16-bit two's complement multiplication, 2 16-bit inputs A and B may be positive numbers or negative numbers. Thus, the 2 inputs A and B are sign-extended to 18 bits, and the multiplication is performed using the 18-bit two's complement array multiplier.

In the 16-bit integer multiplication, the 2 16-bit inputs A and B are always positive numbers. Thus, 2 high-order bits are filled with "0" to form 18 bits, and the multiplication is performed using the 18-bit two's complement array multiplier.

The calculated result of the 18-bit two's complement array multiplier is 36 bits, but the register file 430 storing the result value can receive and transfer data in units of 16 bits only. Therefore, 34 bits excluding the highest-order 2 bits not used for the 36-bit output are divided into lower 16 bits and upper 18 bits, and lower 16 bits of the upper 18 bits are stored in the register file 430 at a first clock while the other 2 bits are stored in a flag flip-flop for floating-point multiplication. At the next clock, the lower 16 bits of the result value of the 18-bit two's complement array multiplier are stored in the register file 430, thereby finishing the multiplication operation. A flag for floating-point multiplication is additionally included in the functional unit 440 to support the normalization of floating-point multiplication, which is one of the characteristics of the present invention.

The arithmetic/logic unit included in the functional unit 440 includes AND, OR and exclusive-OR (XOR) computing modules and an adder/subtractor. The adder/subtractor performs a particular operation for the normalization of floating-point multiplication with reference to the flag for floating-point multiplication.

The shifter included in the functional unit 440 operates on the basis of the multiplexer and can perform a shift operation to the left or right by 0 to 15 bits. Like the arithmetic/logic unit, the shifter also performs a particular operation for the normalization of floating-point multiplication with reference to the flag for floating-point multiplication.

Functional characteristics of the above-described parallel processor structure according to the present invention will be described below.

First, the parallel processor structure of the present invention additionally supports hardware for floating-point addition and multiplication used in the geometric transformation stage of a 3D graphics process.

A parallel processor "Kestrel" emulates a floating-point operation without using a floating-point operation unit, thus considerably deteriorating its computing speed. A processor "T4G" additionally uses a rendering engine to perform a 3D graphics operation, thus requiring high hardware cost. To solve these problems, the present invention uses a method described below.

In general, an Institute of Electrical and Electronics Engineers (IEEE) 754 single precision format, which is a 32-bit floating-point format, is frequently used for performing a floating-point operation. However, 24 bits are enough for the precision of a floating-point number required for a 3D graphics process, such as OpenGL, DirectX, etc., and thus the parallel processor of the present invention uses a 24-bit floating-point format.

Figure 5:
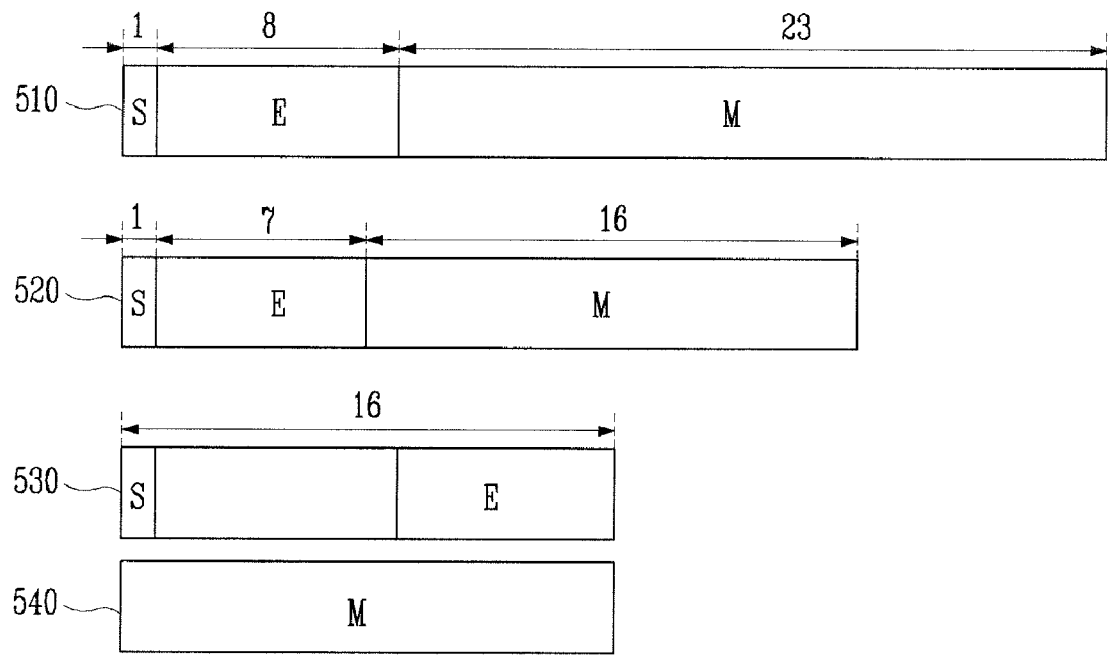
FIG. 5 illustrates a bit structure in an Institute of Electrical and Electronics Engineers (IEEE) 754 single-precision format, a bit structure in a 24-bit floating-point format used in the present invention, and a bit structure of the 24-bit floating-point format stored in 2 16-bit registers according to the present invention.

Referring to FIG. 5, a bit structure in the IEEE 754 single-precision format 510, a bit structure in a 24-bit floating-point format 520 used in the present invention, and a bit structure of the 24-bit floating-point format divided and stored in 2 16-bit registers 530 and 540 are illustrated. As illustrated in the drawing, while the IEEE 754 single-precision format 510 consists of one bit of sign, 8 bits of exponent and 23 bits of mantissa, the 24-bit floating-point format 520 of the present invention consists of one bit of sign, 7 bits of exponent and 16 bits of mantissa.

In the present invention, to store the 24-bit floating-point format 520 in 16-bit registers, a sign part and an exponent part are separately stored in the highest-order bit and lower bits of the first register 530, and a mantissa part is stored in the second register 540.

As described above, since a floating-point addition operation requires a large amount of computing, the floating-point accumulator array 130 is used for accelerating the floating-point addition operation in the present invention. As illustrated in FIG. 2, the 24 floating-point accumulators 131 are connected to the north of the PE array 120.

In addition, to support floating-point multiplication operations, a mechanism is provided which uses a flag for floating-point multiplication used by a multiplier, an arithmetic/logic unit and a shifter of the functional unit 440 in a PE. To make practical use of such a mechanism, a parallel algorithm developer can use an instruction for floating-point multiplication.

The second characteristic of the parallel processor according to the present invention is that an instruction is processed based on a partitioned Single-Instruction Multiple-Data (SIMD) method. To this end, PEs of the parallel processor are classified into at least 2 groups, and different control signals are applied to the respective groups. The PEs of the PE array 120 may be classified into 4 groups G0, G1, G2 and G3, and the respective groups may perform slightly different operations. The groups may be classified by 2 methods.

Figure 6:
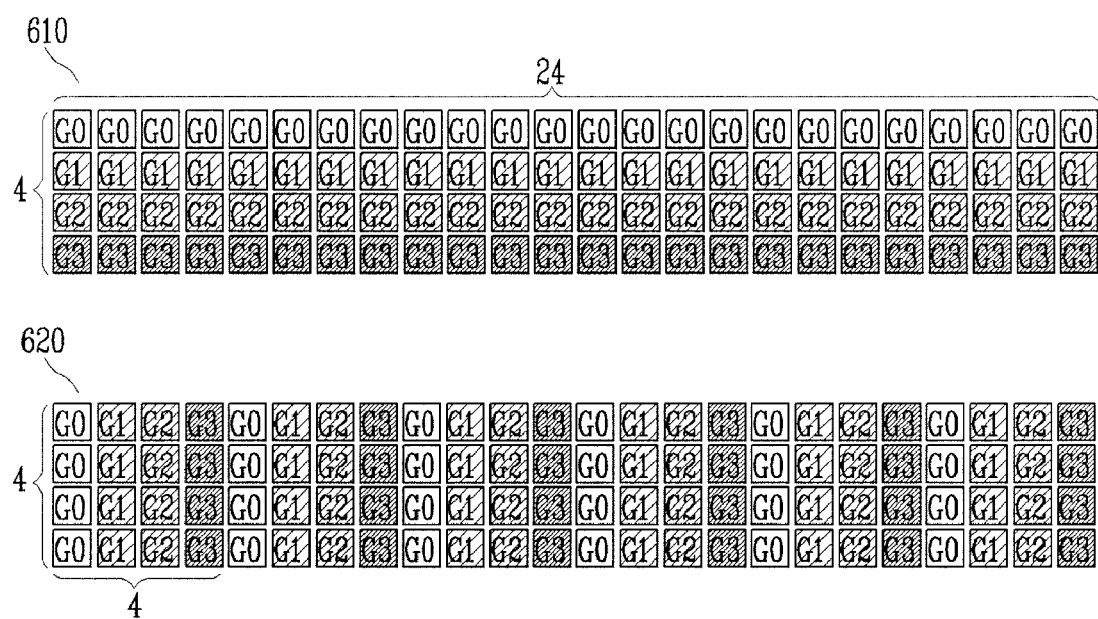
FIG. 6 illustrates 2 methods of classifying PEs into groups for a partitioned Single-Instruction Multiple-Data (SIMD) method according to the present invention.

FIG. 6 illustrates the 2 methods of classifying PEs into groups for the partitioned SIMD method according to the present invention. One method 610 uses a row index as a group index, thereby classifying PEs into a zeroth row processor, a first row processor, a second row processor and a third row processor. The other method 620 classifies PEs into 4 column groups using indexes of column indexes modulo 4 (확인요) as group indexes. More specifically, PEs of a zeroth column/a fourth column/an eighth column/ . . . constitute a zeroth group, PEs of a first column/a fifth column/a ninth column/ . . . constitute a first group, PEs of a second column/a sixth column/a tenth column/ . . . constitute a second group, and PEs of a third column/a seventh column/an eleventh column/ . . . constitute a third group.

Here, different groups may differently receive control signals mux_IN, addr_IN and addr_C illustrated in FIG. 4. Using the method, respective groups can receive data from neighboring PEs in different directions (mux_IN), store the data received from the neighboring PEs or data from a local memory in different registers of a register file (addr_IN), and transfer data of different registers of the register file to neighboring processors or the local memory (addr_C).

The third characteristic of the parallel processor according to the present invention is that all instructions used in the parallel processor of the present invention are conditionally executed. The respective PEs use a flag for conditional execution. The flag is different from a flag for floating-point multiplication and is referred to when any instruction is executed. There are 5 types of flags as described below.

[1]: Always 1.

[Z]: The output of an arithmetic/logic unit is 0.

[N]: The output of an arithmetic/logic unit is a negative number.

[f1]: [Z] flag is maintained. A user can determine whether or not to store a flag value.

[f2]: [N] flag is maintained. A user can determine whether or not to store a flag value.

[1] flag, whose value is not changed according to the output of an arithmetic/logic unit included in a functional unit, is used when the calculation result of the arithmetic/logic unit is stored in a register file without a specific condition. [Z] and [N] flags are updated when the output of the arithmetic/logic unit varies at every clock, according to the varying output. On the other hand, [f1] and [f2] flags are used when the values of [Z] and [N] flags are needed to be maintained. In other words, [f1] and [f2] flags may not be updated when the output of the arithmetic/logic unit varies at every clock. Rather, a user may determine whether or not to update [f1] and [f2] flags.

When instructions are conditionally executed, it is possible to determine whether or not to store the operation result of a functional unit, data from a neighboring PE or data from a memory according to flags to which respective PEs included in a PE array refer. Thus, different processors can perform different operations according to conditions. A simple example of conditional execution will be described below.

Figure 7:
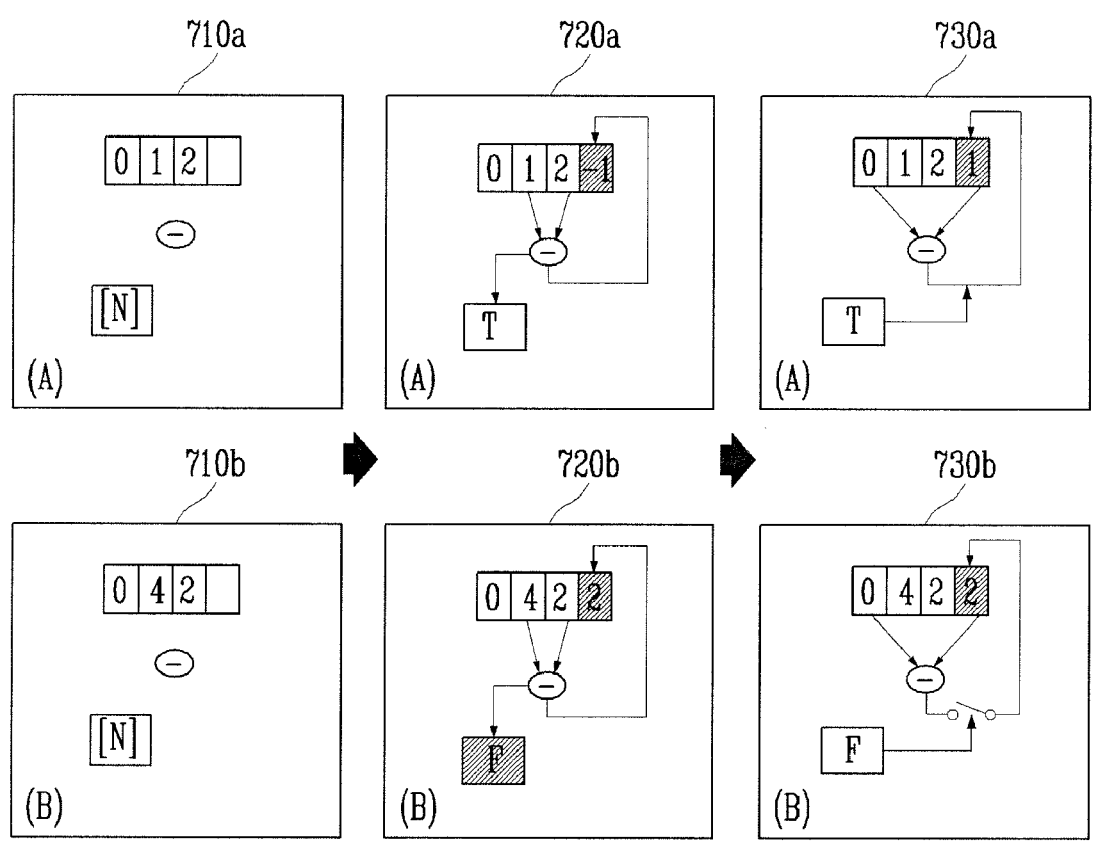
FIG. 7 illustrates an example of conditional execution according to the present invention.

FIG. 7 illustrates an example in which an operation of calculating an absolute value (|A−B|) of a difference between 2 values is performed by 2 different PEs according to the present invention. An algorithm of calculating the absolute value (|A−B|) is as follows:

[STEP 1] $C:=A-B$

[STEP 2] When C is a negative number, C:=−C.

Referring to FIG. 7, (A) PE calculates an absolute value of (1−2) (step 710*a*), and (B) PE calculates an absolute value of (4−2) (step 710*b*). In (A) PE, the result value (1−2=−1) is stored in a register, and [N] flag becomes true (step 720*a*). In (B) PE, the result value (4−2=2) is stored in a register, and [N] flag becomes false (step 720*b*). Subsequently, the (A) and (B) PEs execute an instruction "When [N] flag is true, C:=0−C." Then, (A) PE, whose [N] flag is true, calculates (0−(−1)) (step 730*a*), and (B) PE, whose [N] flag is false, does not calculate anything (step 730*b*). As a result, the (A) and (B) PEs calculate |A−B| and store the results in their registers.

As described above, a parallel processor according to the present invention has a variety of particular characteristics to efficiently process multimedia computing. More specifically, it is possible to obtain effects as described below.

Unlike Kestrel or T4G, it is possible to perform geometric transformation in a 3D graphics process at low cost using 24 floating-point accumulators and a flag for floating-point multiplication included in a functional unit.

In addition, using a mesh network structure at low cost, processors communicate with each other. Meanwhile, to overcome the drawback of the mesh network structure that a long data transfer time is taken for communication between non-neighboring PEs, the parallel processor of the present invention can simultaneously perform computing and data transfer.

Further, while supporting a row mode and a column mode, the parallel processor of the present invention differently provides not all instructions but only some of them to respective rows or columns, thereby enabling development of a flexible algorithm through a small increase in bus width. In other words, a partitioned SIMD method is used, which partially uses a plurality of instructions while fundamentally using the SIMD method.

In a parallel processor, the major drawback of the SIMD method is that processors perform the same operation at the same time. To solve the problem, the parallel processor of the present invention conditionally executes all instructions. Thus, it is possible to develop an algorithm allowing different processors to perform different operations at the same time.

Furthermore, all PEs in a parallel processor structure according to the present invention are directly connected with a local memory, thus consuming low power and having a short memory access time. In addition, when a processor communicates with a memory, the same address value given from a control unit is used as a memory address, thus requiring a small bus width.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A parallel processor, comprising:
    a Processing Element (PE) array having a plurality of PEs;
    a local memory directly connected to the PE array;
    a separate floating-point accumulator array having a plurality of accumulators for performing a floating-point addition operation, wherein the floating-point accumulator array includes the same number of accumulators as PEs included in an uppermost row of the PE array and each of the accumulators communicates with a PE of the same column in the uppermost row to perform a floating-point addition operation; and
    a control unit for reading an instruction from an external memory, broadcasting the instruction to the PEs of the PE array, and addressing the local memory when a PE communicates with the local memory.

2. The parallel processor of claim 1, wherein the PEs in the PE array are connected in a mesh network structure, and each of the PEs perform two-way communication with neighboring PEs to the north, south, east and west of the PE itself.

3. The parallel processor of claim 1, wherein the respective PEs have memory spaces respectively allocated to themselves in the local memory.

4. The parallel processor of claim 1, wherein the respective PEs comprise a conditional execution flag to conditionally execute the instruction.

5. The parallel processor of claim 1, wherein the respective PEs comprise:
    input and output ports for transferring and receiving data to and from neighboring PEs;
    a functional unit for performing arithmetic and logical operations;
    a register file for storing an operator to be input to the functional unit and the operation result of the functional unit; and
    an instruction decoder for decoding the instruction received from the control unit and generating a control signal for controlling operation of the input and output ports, the register file, and the functional unit.

6. The parallel processor of claim 5, wherein the functional unit comprises:
   a multiplier;
   an arithmetic/logic unit; and
   a shifter.

7. The parallel processor of claim 6, wherein the multiplier is an 18-bit two's complement array multiplier for supporting 16-bit two's complement multiplication, 16-bit integer multiplication and 16-bit mantissa multiplication.

8. The parallel processor of claim 6, wherein the functional unit further comprises a flag for floating-point multiplication used for normalization of floating-point multiplication.

9. The parallel processor of claim 5, wherein the register file comprises 2 inputs, and simultaneously stores the operation result of the functional unit and data received from one of the neighboring PEs and the local memory.

10. The parallel processor of claim 1, wherein the PEs of the PE array are classified into at least 2 groups and different control signals are applied to the respective groups, to process the instruction according to a partitioned Single-Instruction Multiple-Data (SIMD) method.

* * * * *